United States Patent
Hayakawa et al.

(10) Patent No.: US 8,700,305 B2
(45) Date of Patent: Apr. 15, 2014

(54) DRIVING CONTROL DEVICE

(75) Inventors: Yasuhisa Hayakawa, Yokohama (JP); Kou Sato, Atsugi (JP); Masahiro Kobayashi, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/518,249

(22) PCT Filed: Dec. 1, 2010

(86) PCT No.: PCT/JP2010/071486
§ 371 (c)(1),
(2), (4) Date: Jun. 21, 2012

(87) PCT Pub. No.: WO2011/077915
PCT Pub. Date: Jun. 30, 2011

(65) Prior Publication Data
US 2012/0265431 A1 Oct. 18, 2012

(30) Foreign Application Priority Data

Dec. 24, 2009 (JP) ................................. 2009-292705
Nov. 17, 2010 (JP) ................................. 2010-256594

(51) Int. Cl.
*G06F 17/10* (2006.01)
*G06G 7/78* (2006.01)
*G08G 1/16* (2006.01)

(52) U.S. Cl.
USPC ........................................................ 701/301

(58) Field of Classification Search
USPC ........................................................ 701/301
See application file for complete search history.

(56) References Cited

U.S. PATENT DOCUMENTS

| 8,112,225 | B2 * | 2/2012 | Eidehall et al. ................ 701/301 |
| 8,170,788 | B2 | 5/2012 | Sjögren et al. |
| 2005/0015203 | A1 * | 1/2005 | Nishira ........................ 701/301 |
| 2005/0017858 | A1 * | 1/2005 | Gross ............................ 340/435 |
| 2005/0043879 | A1 * | 2/2005 | Desens et al. ................... 701/96 |
| 2005/0189471 | A1 * | 9/2005 | Nagasawa .................. 250/208.1 |
| 2005/0228588 | A1 * | 10/2005 | Braeuchle et al. ............ 701/301 |
| 2008/0065328 | A1 * | 3/2008 | Eidehall et al. ................ 701/301 |

FOREIGN PATENT DOCUMENTS

| JP | 8-253160 A | 10/1996 |
| JP | 9-221052 A | 8/1997 |
| JP | 9-249149 A | 9/1997 |
| JP | 10-166974 A | 6/1998 |
| JP | 2001-171449 A | 6/2001 |
| JP | 2009-12493 A | 1/2009 |
| JP | 2009-274594 A | 11/2009 |
| JP | 2009-539681 A | 11/2009 |
| JP | 2011-22990 A | 2/2011 |
| RU | 2 310 922 C2 | 11/2007 |
| WO | WO 2007/145564 A1 | 12/2007 |

OTHER PUBLICATIONS

Russian Decision on Grant, Feb. 14, 2014, 16 pages.

\* cited by examiner

*Primary Examiner* — Mary Cheung
*Assistant Examiner* — Frederick Brushaber
(74) *Attorney, Agent, or Firm* — Foley & Lardner LLP (57) ABSTRACT

A driving control device according to the present invention activates a control for suppressing sideways movement of a vehicle towards a side object, when the side object present to the side of the vehicle as well as towards the rear of the vehicle is detected. Also, the activation of the control is suppressed when, in the absence of detection of the side object, the vehicle starts entering an adjacent lane in order to change lanes.

23 Claims, 7 Drawing Sheets

DRIVING CONTROL DEVICE

TECHNICAL FIELD

The present invention relates to a driving control device for avoiding contact with a side object when a vehicle moves sideways to change lanes or do the like.

BACKGROUND ART

There has been a device that detects the presence or absence and direction of steering and also an obstacle present to the side and a little towards the rear of a vehicle body, and suppresses steering when it determines that the steering may possibly cause contact with the obstacle. (Refer to Patent Literature 1.)

PRIOR ART LITERATURE

Patent Literature

Patent Literature 1: Japanese Patent Application Publication No. H8(1996)-253160

SUMMARY OF INVENTION

Technical Problem

Incidentally, it is assumed that, in the absence of other vehicles approaching from the rear, a vehicle starts changing lanes to get in an adjacent lane, and, after the vehicle has begun entering the adjacent lane, other vehicle is approaching from the rear in the target lane. In this case, it may be proper that the vehicle quickly finishes changing lanes rather than stops changing lanes to make way for the other vehicle approaching from the rear. In other words, the right of way varies according to circumstances on the occasion, and therefore, a driver may possibly feel uncomfortable if a lane change is invariably suppressed whenever the approach of the other vehicle from the rear is detected.

An object of the present invention is to prevent improper intervention of control to suppress sideways movement of a vehicle at the time of lane change.

Solution to Problem

A driving control device according to the present invention activates a control for suppressing sideways movement of a vehicle towards a side object, when the side object present to the side of the vehicle as well as towards the rear of the vehicle is detected. Also, the activation of the control is suppressed even if the side object is detected, when, in the absence of detection of the side object, the vehicle starts entering an adjacent lane in order to change lanes.

DESCRIPTION OF EMBODIMENTS

Embodiments of the present invention will be described below with reference to the drawings.

[First Embodiment]
[Configuration]

Figure 1:
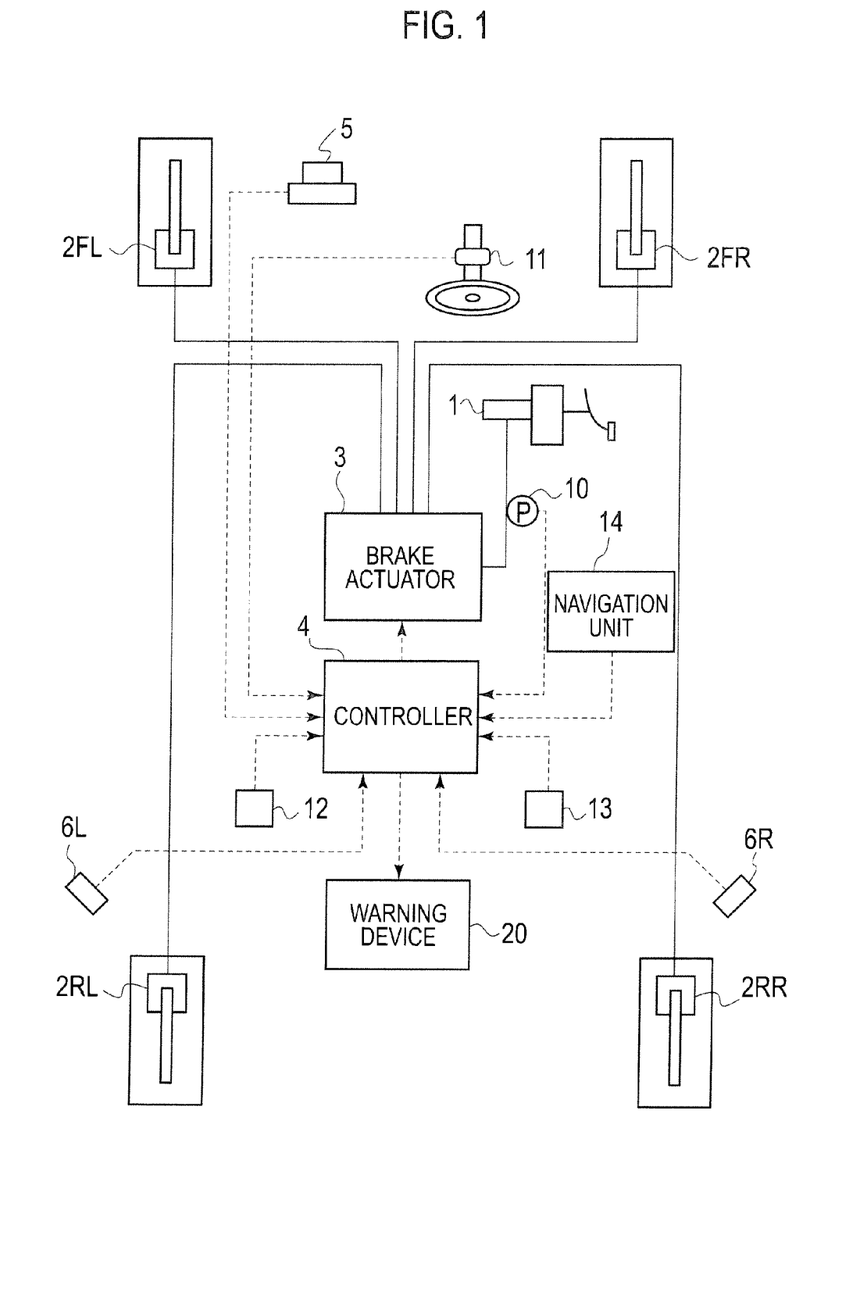
FIG. 1 is a schematic block diagram of a general outline of a configuration of a vehicle.

FIG. 1 shows a general outline of a configuration of the present invention. A brake actuator 3 for use in antiskid control (ABS: Antilock Braking System), traction control (TCS: Traction Control System), stability control (VDC: Vehicle Dynamics Control), and the like is interposed between a master cylinder 1 and wheel cylinders $2i$ (where i=FL, FR, RL, RR). The brake actuator 3 includes hydraulic devices such as a solenoid valve and a pump, and these devices are drivingly controlled by a controller 4 thereby to allow individual control of hydraulic pressures of the wheel cylinders $2i$ regardless of driver's brake operation.

Also, a camera 5 that takes an image of a view towards the front of a vehicle is provided, and an image processing apparatus (not shown) detects a driving lane by recognizing a lane separation line such as a white line (i.e. what is called a lane marking, hereinafter referred to as the white line) based on taken image data, and also calculates a yaw angle $\phi$ of the vehicle with respect to the driving lane, a lateral displacement X with respect to the driving lane, and a curvature $\rho$ of the driving lane, and inputs various signals to the controller 4. When a road surface has no white line, the driving lane may be estimated based on an edge of the road, a guardrail, a curb, and the like. Incidentally, in the embodiment, a lateral direction refers to a width direction of the lane, and a longitudinal direction refers to an extending direction of the lane. Also, the lateral displacement X refers to a distance in the lateral direction from the center of the driving lane to the center of the vehicle in its vehicle width direction, and the yaw angle $\phi$ refers to the angle formed by the extending direction of the lane and a front-to-rear direction of the vehicle.

Incidentally, calculation of the yaw angle $\phi$ can be accomplished for example by converting the image data taken by the camera 5 into a bird's-eye-view image, and detecting an angle of the white line (or the lane marking) with respect to a direction from top to bottom of the converted image (or the front-to-rear direction of the vehicle). Also, the yaw angle $\phi$ may be calculated as given below:

$$\varphi = \tan^{-1}(dX/dY)$$
$$= \tan^{-1}(dX'/V)$$

where dX denotes the amount of change in the lateral displacement X per predetermined time; dY, the amount of change in a distance which the vehicle travels by its forward movement (that is, the position of the vehicle in the longitudinal direction) per predetermined time; dX', a value obtained by differentiating dX with respect to time; and V, a vehicle speed to be described later.

Also, calculation of the curvature p may be obtained from a navigation unit 14 to be described later. Methods for calculating the lateral displacement X of the vehicle, the curvature p of the driving lane, the yaw angle ϕ, and the like, based on the image data on the view towards the front of the vehicle, taken by the camera 5 will not be described in detail because of being known technologies previously employed in various devices, such for example as a lane-keeping driving control device, which control the vehicle by recognizing the white line.

Meanwhile, radar devices 6L, 6R using millimeter waves, for example, are provided on the left and right sides, respectively, of the vehicle thereby to detect side objects present to the sides of the vehicle (and a little towards the rear of the vehicle), which are prone to be in a driver's blind spot. The radar devices 6L, 6R detect whether or not objects (hereinafter referred to as side objects) are present in predetermined regions to the sides of the vehicle as well as towards the rear of the vehicle (hereinafter, sometimes described as "rearwardly to the sides of the vehicle"), that is, the presence or absence of the side objects, and also detect a relative distance to the vehicle in the lateral direction, a relative distance in the front-to-rear direction, a relative speed, and the like. Incidentally, the radar devices 6L, 6R are not limited to millimeter wave radars using the millimeter waves but may be laser radars for example, or may be devices that detect the presence or absence of the side objects or a relationship of the side objects and the vehicle relative to each other, based on images taken by a camera that takes the images of views rearwardly to the sides of the vehicle. In other words, any device will do for the radar devices 6L, 6R, provided only that they can detect the presence or absence of the side objects or the relationship relative to the vehicle, and thus, the radar devices 6L, 6R may be changed as appropriate.

Also, a master cylinder pressure Pm detected by a pressure sensor 10, a steering angle δ detected by a steering angle sensor 11, wheel speeds $Vw_i$, detected by a wheel speed sensor 12, and the operating status of a direction indicator switch 13 are inputted to the controller 4. Further, a front-to-rear acceleration Yg and a lateral acceleration Xg of the vehicle detected by an accelerometer (not shown), a yaw rate Ψ detected by a yaw rate sensor (not shown), and road information or the like obtained from the navigation unit 14 are inputted to the controller 4. Incidentally, the wheel speed sensor 12 detects a wheel speed $Vw_{FL}$ of a front left wheel, a wheel speed $Vw_{FR}$ of a front right wheel, a wheel speed $Vw_{RL}$ of a rear left wheel and a wheel speed $Vw_{RR}$ of a rear right wheel of the vehicle, and these wheel speeds are generically called the wheel speeds $Vw_i$.

When the above-described various data have left and right directional characteristics, any data is taken as a positive value for a leftward direction or as a negative value for a rightward direction. Specifically, the yaw angle ϕ and the steering angle δ are taken as positive values at the time of left turn or as negative values at the time of right turn, and the lateral displacement X is taken as a positive value when the vehicle is displaced to the left with respect to the center of the driving lane, or as a negative value when the vehicle is displaced to the right.

Also, a warning device 20 is provided to sound a warning or light a warning lamp in response to a warning signal outputted by the controller 4.

The controller 4 executes a lane change warning control process to be described later.

Figure 2:
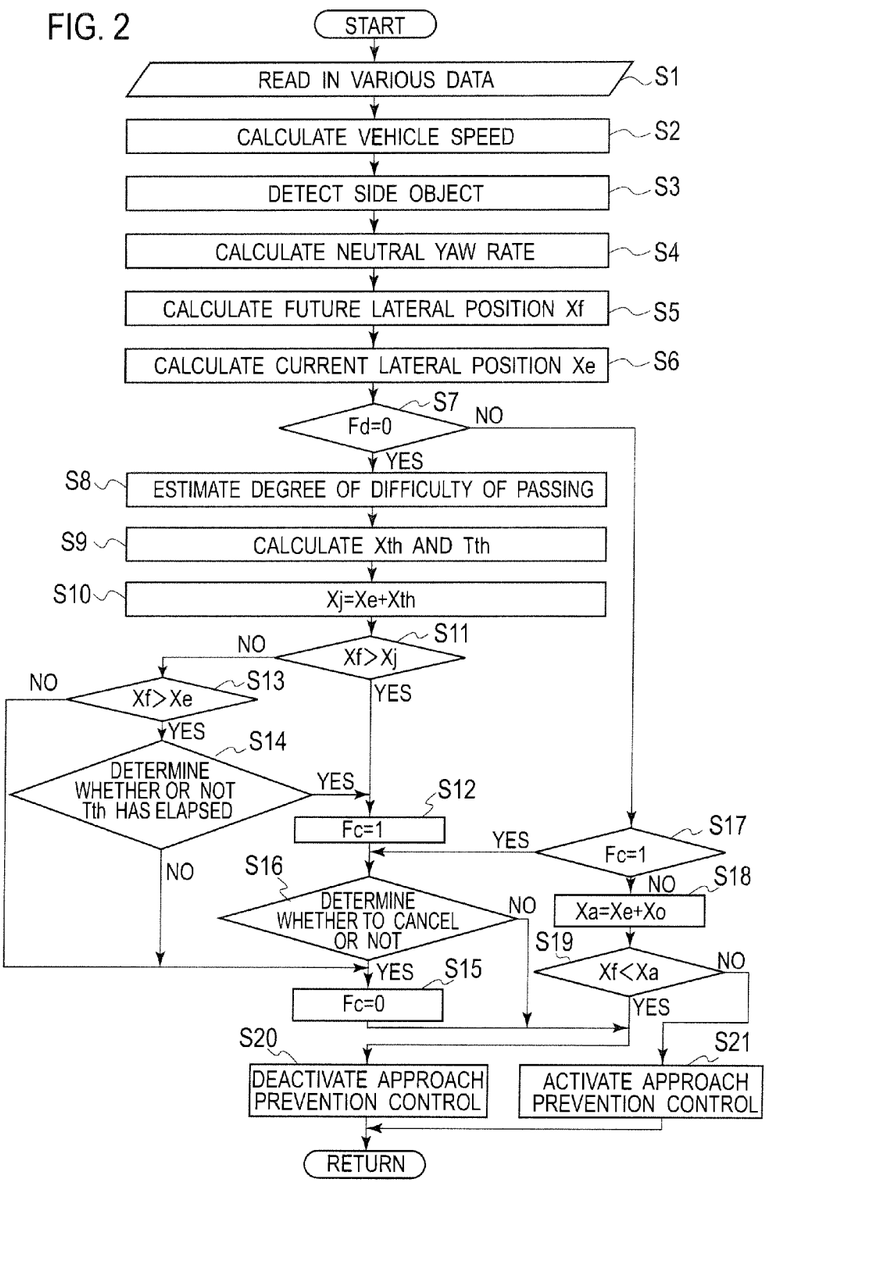
FIG. 2 is a flowchart of a lane change warning control process.

Next, description will be given with regard to the lane change warning control process which the controller 4 executes as a timer interruption at predetermined time intervals (for example, at intervals of 10 msec). following a flowchart of FIG. 2.

First, at step S1, various data are read in.

Then, at step S2, an average wheel speed of non-driven wheels (or idler wheels) is calculated to determine the vehicle speed V, as given below. Incidentally, when V can be obtained from antiskid control or navigation information, the obtained value may be used.

In the case of front-wheel drive, V is given by the equation:
$$V=(Vw_{RL}+Vw_{RR})/2$$
In the case of rear-wheel drive, V is given by the equation:
$$V=(Vw_{FL}+Vw_{FR})/2$$

Then, at step S3, the presence or absence of a side object is determined based on results detected by the radar devices 6L, 6R. Here, when the side object is absent, a detection flag Fd is reset to "0." Meanwhile, when the side object is present, the detection flag Fd is set to "1."

Then, at step S4, a neutral yaw rate Ψp as the yaw rate required for the vehicle to maintain driving along a driving route is calculated according to the curvature p and the vehicle speed V, as given below. The neutral yaw rate Ψp is zero during driving along a straight road. However, in the case of a curved road, the neutral yaw rate Ψp varies according to the curvature p of the driving lane. Therefore, the curvature p of the driving lane is used for calculation of the neutral yaw rate Ψp.

$$\Psi p = p \times V$$

Then, at step S5, any one of the following methods 1 and 2 is used to calculate a distance in the lateral direction between the current lateral position of the vehicle (or the position of the vehicle in the lateral direction) and the lateral position of the vehicle after a lapse of a predetermined frontward watch time Tt (for example, about 1 sec) (that is, a difference between the current lateral displacement and the lateral displacement after the lapse of the frontward watch time Tt). Here, the distance in the lateral direction between the current lateral position of the vehicle and the lateral position of the vehicle after the lapse of the predetermined frontward watch time Tt is a value indicating the lateral position of the vehicle after the lapse of the predetermined frontward watch time Tt relative to the current lateral position of the vehicle. Thus, the distance in the lateral direction between the current lateral position of the vehicle and the lateral position of the vehicle after the lapse of the predetermined frontward watch time Tt will be termed a "future lateral position Xf," and a position that is the "future lateral position Xf" away from the current lateral position of the vehicle, that is, the position (or the absolute position) of the vehicle in the lateral direction after the lapse of the frontward watch time Tt, will also be termed the "future lateral position."

1. Calculation is performed according to the yaw angle ϕ, a target yaw rate Ψm, and a target yaw angle acceleration Ψm'

Here, weights are assigned to the yaw angle ϕ, the target yaw rate Ψm, and the target yaw angle acceleration Ψm', and their weighted values are added together, as given below:

$$Xf = K1 \times \phi + K2 \times \Psi m + K3 \times \Psi m'$$

where K1 to K3 each denote gain; K1, a value obtained by multiplying the frontward watch time Tt by the vehicle speed V; K2, a value obtained by multiplying a predetermined value by the vehicle speed V; and K3, a value obtained by multiplying a predetermined value by the vehicle speed V.

The target yaw rate Ψm and the target yaw angle acceleration Ψm' are calculated as follows:

$$\Psi d = Kv \cdot \delta \cdot V$$

$$\Psi m = \Psi h \times Tt$$

$$\Psi m' = \Psi m \times Tt^2$$

where Ψd denotes a reference yaw rate as the yaw rate to be generated by driver's steering operation, determined according to the steering angle δ and the vehicle speed V, Ψh denotes a value obtained by subtracting the neutral yaw Ψp rate from the reference yaw rate Ψd (that is, Ψh=−Ψp), or equivalently, Ψh may be safely said to be the yaw rate depending on driver's intention to change lanes, and Kv denotes gain preset according to vehicle specifications or the like.

2. Calculation is performed according to the target yaw rate Ψm and the target yaw angle acceleration Ψm'.

Here, weights are assigned to the target yaw rate Ψm and the target yaw angle acceleration Ψm', and their weighted values are subjected to select-high, as given below.

$$Xf = \max[K2 \times \Psi m, K3 \times \Psi m']$$

Figure 3:
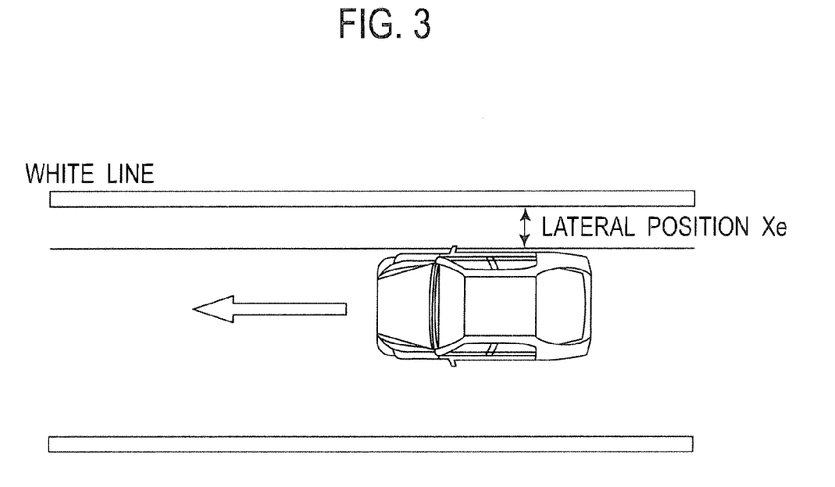
FIG. 3 is a view showing the current lateral position of the vehicle relative to a lane separation line.

Then, at step S6, the current lateral position Xe of the vehicle relative to the white line is calculated based on image data on a view towards the front of the vehicle, taken by the camera 5. The current lateral position Xe is a distance in the lateral direction from the white line to the side of the vehicle close to the white line. (See FIG. 3.) Incidentally, the current lateral position Xe is taken as a positive value when the vehicle does not cross over the white line but stays in its lane, while the current lateral position Xe is taken as a negative value when the vehicle crosses over the white line. Also, the current lateral position Xe can be calculated by a known approach, such for example as by converting the image data taken by the camera 5 into a bird's-eye-view image, and performing calculation based on the position of the white line on the bird's-eye-view image, as is the case with the lateral displacement X and the like.

Then, at step S7, a determination is made as to whether or not the detection flag Fd is reset to "0" (Fd=0). When a determined result is that Fd=0, a determination is made that a side object is absent, and the processing goes to step S8. Meanwhile, when a determined result is that the detection flag Fd is set to "1" (Fd=1), a determination is made that the side object is present, and the processing goes to step S17 to be described later.

At step S8, the degree of difficulty of passing the vehicle for a side vehicle approaching the vehicle from the rear in a target lane (or the difficulty of passing the vehicle) when the vehicle starts entering an adjacent lane in order to change lanes is estimated.

Specifically, any one of the following methods 1 to 5, for example, is used to estimate the degree of difficulty of passing.

1. Estimation is performed based on the lane width of the target lane.

Figure 4:
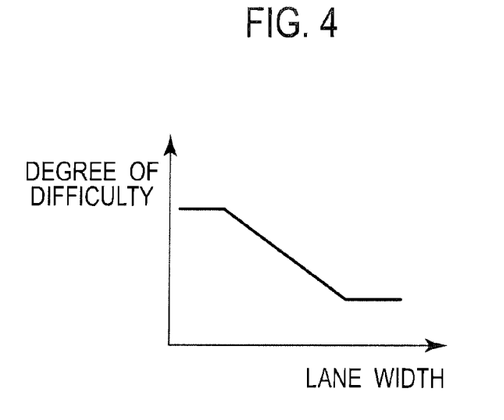
FIG. 4 is a map used to calculate the degree of difficulty according to the width of an adjacent lane.

As the width of the adjacent lane as the target lane is narrower, passing the vehicle can be expected to be more difficult for the side vehicle approaching the vehicle from the rear, when the vehicle starts entering the adjacent lane. Therefore, as shown in FIG. 4, the degree of difficulty of passing is estimated to be higher as the width of the adjacent lane is narrower. The lane width of the adjacent lane is obtained from the navigation unit 14, or is obtained from an infrastructure.

Figure 5:
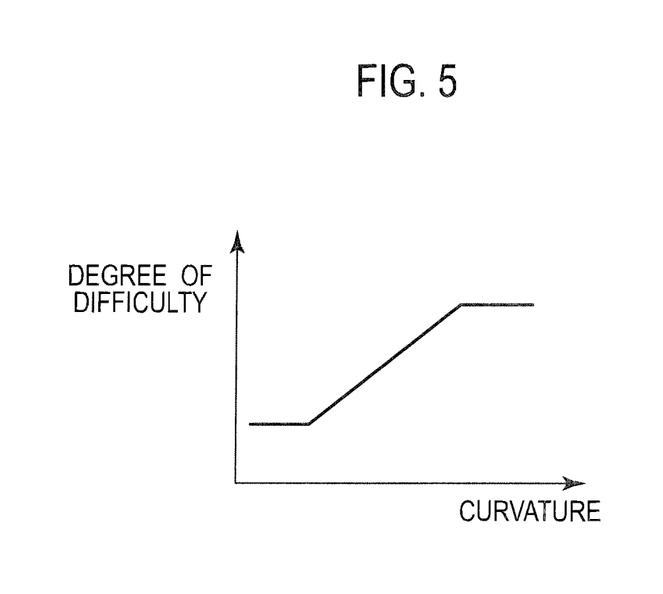
FIG. 5 is a map used to calculate the degree of difficulty according to the curvature of a road.

2. Estimation is performed based on the curvature of a road.

As the curvature p of the road is larger, that is, as a curve is tighter, passing the vehicle can be expected to be more difficult for the side vehicle approaching the vehicle from the rear, when the vehicle starts entering the adjacent lane. Therefore, as shown in FIG. 5, the degree of difficulty of passing is estimated to be higher as the curvature of the road is larger.

3. Estimation is performed based on the type of driving lane of the target lane.

One of driving lane types is a lane called a carpool lane. The carpool lane is a fast lane in which priority of driving is given to a shared vehicle in which a given number of persons or more ride together, and is sometimes called a HOV lane (high-occupancy vehicle lane) in the U.S. Generally, the carpool lane tends to be narrow in its lane width, be in close proximity to a concrete wall, or be in poorly paved condition. Thus, when the adjacent lane as the target lane is the carpool lane, passing the vehicle can be expected to be more difficult for the side vehicle approaching the vehicle from the rear when the vehicle starts entering the adjacent lane, than when the adjacent lane is not the carpool lane. Therefore, when the adjacent lane is the carpool lane, the degree of difficulty of passing is estimated to be higher. The type of driving lane is obtained from the navigation unit 14, or is obtained from an infrastructure.

Figure 6:
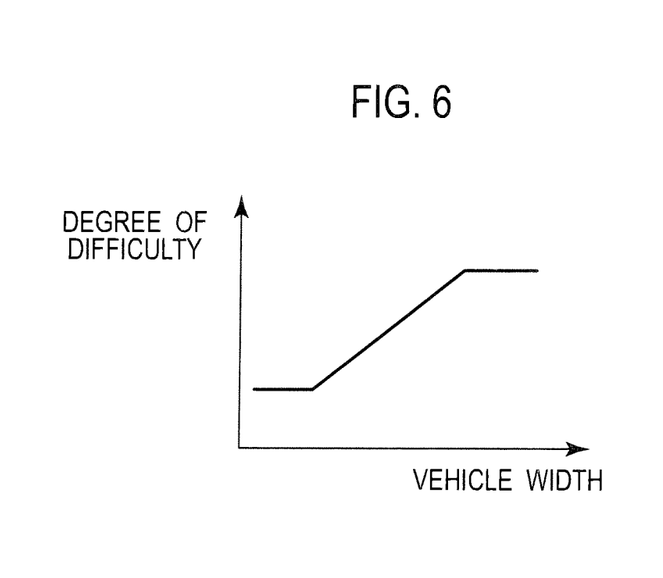
FIG. 6 is a map used to calculate the degree of difficulty according to the vehicle width of a side vehicle.

4. Estimation is performed based on the vehicle width of the side vehicle.

As the vehicle width of the side vehicle is larger, passing the vehicle can be expected to be more difficult for the side vehicle approaching the vehicle from the rear. Therefore, as shown in FIG. 6, the degree of difficulty of passing is estimated to be higher as the vehicle width of the side vehicle is larger. Incidentally, this process is performed, provided that a result of the process of step S7 is that the side object is absent (Fd=0); however, when the side object can be detected in a region (or a second region) towards the rear of a normal region (or a first region) in which the presence or absence of the side object is detected, the process is performed by estimating the vehicle width of the detected side object. Incidentally, the radar devices 6L, 6R can be generally used to detect the vehicle width of the side vehicle, and, for example, output waves from the radar devices 6L, 6R may be scanned in a horizontal direction thereby to detect the vehicle width based on a scan angle and reflected waves.

5. The above-described methods 1 to 4 are used in combination.

For example, calculation of an average value, select-low, or weighting and addition is performed.

Figure 7:
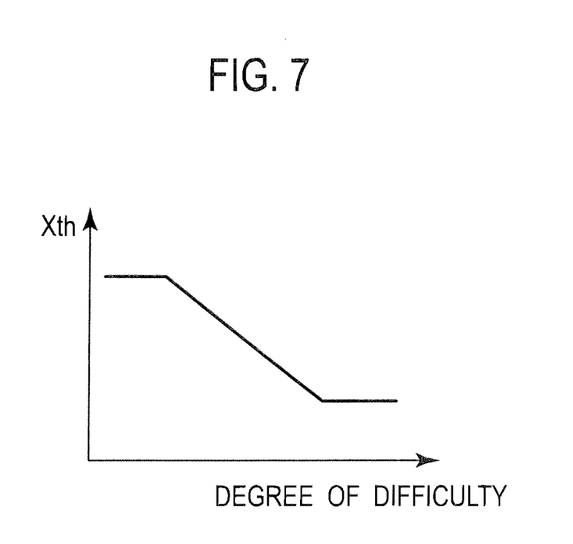
FIG. 7 is a map used to calculate a setting value Xth.
Figure 8:
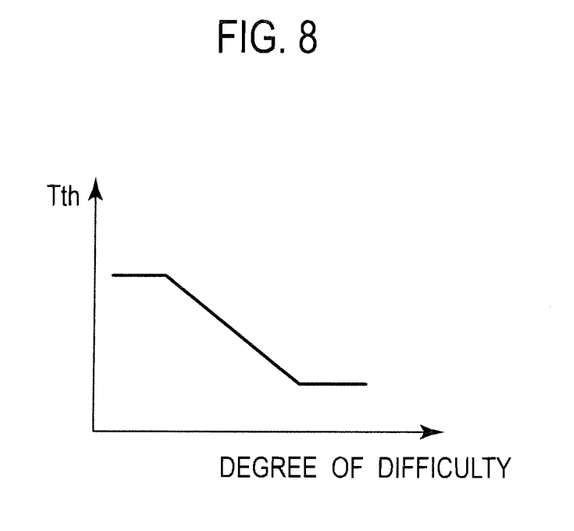
FIG. 8 is a map used to calculate a setting value Tth.

Then, at step S9, setting values Xth and Tth used to set criterion threshold values to be described later are calculated according to the degree of difficulty of passing. Here, the setting value Xth is used to set the criterion threshold value for the future lateral position Xf of the vehicle, and the setting value Tth is used to set the criterion threshold value for an elapsed time since the instant when the vehicle crosses over the white line. First, as shown in FIG. 7, the setting value Xth is set smaller as the degree of difficulty of passing is higher. Also, as shown in FIG. 8, the setting value Tth is set smaller as the degree of difficulty of passing is higher.

Then, at step S10, the setting value Xth is added to the current lateral position Xe thereby to set a criterion threshold value Xj for the future lateral position Xf of the vehicle, as given below.

$$Xj = Xe + Xth$$

Then, at step S11, a determination is made as to whether or not the future lateral position Xf is larger than the criterion threshold value Xj, that is, whether or not the lateral position (or the future lateral position) of the vehicle after the lapse of the frontward watch time Tt lies outside the lane beyond a lateral position that is the criterion threshold value Xj away in a direction toward the outside of the lane with respect to the white line. When a determined result is that Xf is larger than Xj (Xf>Xj), a determination is made that the vehicle has started entering the adjacent lane in order to change lanes, and the processing goes to step S12. Meanwhile, when a determined result is that Xf is equal to or smaller than Xj (Xf≤Xj), a determination is made that the vehicle has not started entering the adjacent lane, and the processing goes to step S13.

Incidentally, here, in the embodiment, as described above, a determination is made that the vehicle has started entering the adjacent lane, when the lateral position of the vehicle after the lapse of the frontward watch time Tt is detected being in the position in the direction toward the outside of the lane (or towards the adjacent lane) beyond the position at a predetermined distance (i.e. the criterion threshold value Xj) from the white line, based on the lateral position (or the future lateral position) of the vehicle after the lapse of the frontward watch time Tt; however, the present invention is not so limited. A determination may be made that the vehicle has started entering the adjacent lane, for example when the current lateral position Xe of the vehicle is detected being equal to or smaller than a predetermined value (for example, equal to or smaller than 0), based on the current lateral position Xe of the vehicle. In other words, any approach will do, provided only that the driver can detect that the vehicle recognizes that it has started entering the adjacent lane, based on the lateral position of the vehicle after the lapse of the frontward watch time Tt or the current lateral position Xe of the vehicle. Thus, the setting value Xth is set to a value obtained by experimentally or otherwise determining beforehand a value such that the driver can detect that the vehicle recognizes that it has already started entering the adjacent lane, based on the lateral position of the vehicle after the lapse of the frontward watch time Tt and the criterion threshold value Xj.

At step S12, an activation suppression flag Fc is set to "1," and thereafter, the processing goes to step S16 to be described later. The activation suppression flag Fc is the flag that determines whether the activation of an approach prevention control for preventing approach to a side object is to be inhibited or allowed, and the activation suppression flag Fc is set so as to suppress the activation of the approach prevention control when Fc=1, or allow the activation of the approach prevention control when Fc=0.

At step S13, a determination is made as to whether or not the future lateral position Xf is larger than the current lateral position Xe, that is, whether or not the future lateral position that is the lateral position of the vehicle after the lapse of the frontward watch time Tt has crossed over the white line. When a determined result is that Xf is larger than Xe (Xf>Xe), a determination is made that the vehicle has started changing lanes, and the processing goes to step S14. Meanwhile, when a determined result is that Xf is equal to or smaller than Xe (Xf≤Xe), a determination is made that the vehicle has not started changing lanes, and the processing goes to step S15.

At step S14, a determination is made as to whether or not the setting time Tth has elapsed since the instant when the future lateral position crossed over the white line. Here, when a determined result is that the setting time Tth has elapsed, a determination is made that the vehicle has started entering the adjacent lane, and the processing goes to step S12. Meanwhile, when a determined result is that the setting time Tth has not elapsed, a determination is made that the vehicle has not started entering the adjacent lane, and the processing goes to step S15. In other words, even if at step S11 a determination is made that the vehicle has not started entering the adjacent lane (that is, the future lateral position Xf is equal to or smaller than the criterion threshold value Xj (Xf≤Xj)), there is a strong possibility that the vehicle has started entering the adjacent lane, when the future lateral position Xf continues in a state in which it is larger than the current lateral position Xe for a predetermined time (which is the setting time Tth, e.g. 3 seconds). Thus, when at step S14 a determination is made that the setting time Tth has elapsed, a determination is made that the vehicle has started entering the adjacent lane, and the processing goes to step S12. Incidentally, the setting time Tth is set to a time obtained in advance by experiment or the like.

At step S15, the activation suppression flag Fc is reset to "0," and thereafter, the processing goes to step S20 to be described later.

At step S16, a determination is made as to whether to cancel the setting of the activation suppression flag Fc (Fc=1) or not, that is, whether to reset the activation suppression flag Fc to "0" (Fc=0). Conditions for canceling the setting of the activation suppression flag Fc to change it from Fc=1 to Fc=0 are the following conditions 1 to 3. Here, when the cancel conditions are satisfied, the processing goes to step S15. Meanwhile, when the cancel conditions are not satisfied, the processing goes to step S20 to be described later.

1. The condition based on an elapsed time

When a predetermined time (for example, about 2 seconds) elapses since the instant when a determination has been made that the vehicle started entering the adjacent lane, the vehicle can be judged as having almost finished changing lanes. Therefore, the length of elapsed time since the instant of setting the activation suppression flag Fc to "1" (Fc=1) is measured, and, when the predetermined time elapses, a determination is made that the cancel condition is satisfied. Meanwhile, when the predetermined time does not elapse since the instant of setting the activation suppression flag Fc to "1" (Fc=1), the lane change of the vehicle is not finished, and a determination is made that the cancel condition is not satisfied.

2. The condition based on the amount of sideways movement of the vehicle

When the amount of sideways movement of the vehicle (that is, the amount of change in the lateral position of the vehicle) since the instant when a determination has been made that the vehicle started entering the adjacent lane reaches a predetermined amount of sideways movement, the vehicle can be judged as having almost finished changing lanes. Therefore, the amount of sideways movement since the instant of setting the activation suppression flag Fc to "1" (Fc=1) is calculated, and, when the predetermined amount of sideways movement is exceeded, a determination is made that the cancel condition is satisfied. Meanwhile, when the predetermined amount of sideways movement is not exceeded since the instant of setting the activation suppression flag Fc to "1" (Fc=1), the lane change of the vehicle is not finished, and a determination is made that the cancel condition is not satisfied.

3. The condition based on the lateral position of the vehicle

When the lateral position of the vehicle reaches a predetermined lateral position, the vehicle can be judged as having almost finished changing lanes. Therefore, when the current lateral position Xe of the vehicle crosses over the predetermined lateral position, a determination is made that the cancel condition is satisfied. Meanwhile, when the predetermined lateral position is not crossed over, the lane change of the vehicle is not finished, and a determination is made that the cancel condition is not satisfied. Incidentally, in this case, the predetermined lateral position is, for example, the lateral position set at a position in the adjacent lane, and is set to a position obtained by experimentally or otherwise determining a position such that the driver recognizes that the lane change is finished, and is set for example to a position that is half a width dimension of the vehicle or more away from the white line in a direction toward the adjacent lane.

Meanwhile, at step S17, a determination is made as to whether or not the activation suppression flag Fc is set to "1" (Fc=1). When a determined result is that Fc=1, the processing goes to step S16 in order to suppress the activation of the approach prevention control. Meanwhile, when a determined result is that Fc=0, the activation of the approach prevention control can be allowed, and thus, the processing goes to step S18.

At step S18, a setting value Xo smaller than the setting value Xth is added to the current lateral position Xe thereby to set an activation threshold value Xa for the approach prevention control for preventing approach to the side object, as given below.

$$Xa = Xe + Xo$$

Figure 9:
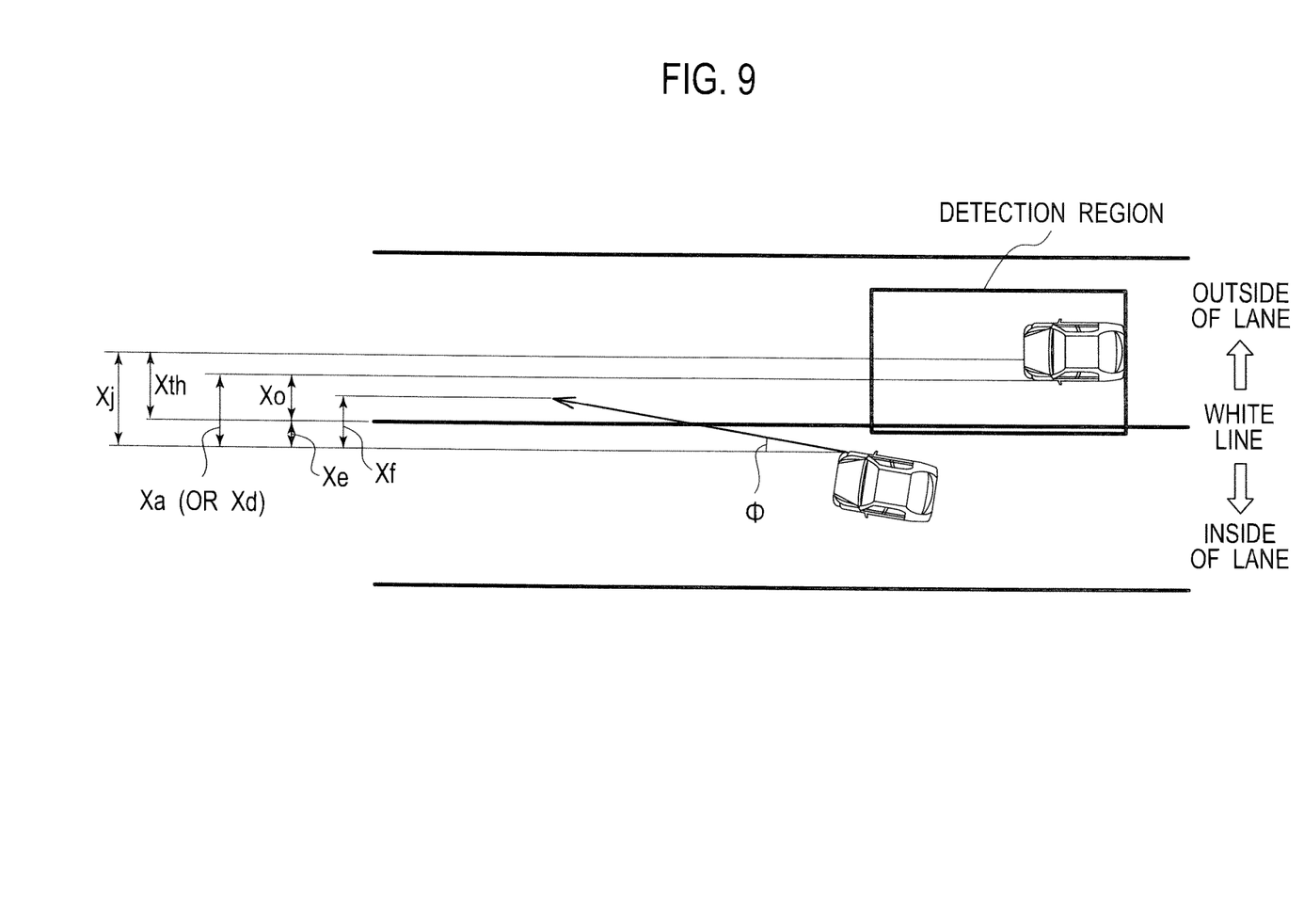
FIG. 9 is a view showing an example of a driving scene.

Here, a distance between the lateral position of the vehicle and the current lateral position of the side object is defined as the activation threshold value Xa. In short, as shown in FIG. 9, the activation threshold value Xa is a distance in the lateral direction between the vehicle and the side object, assuming that the side object (or the side vehicle) is in a predetermined position that is the predetermined amount Xo away outside of the lane with respect to the white line. In other words, when the side vehicle running along the adjacent lane is present, a distance from a possible lateral position of the running side vehicle to the white line is assumed and set as the predetermined amount Xo. Of course, when a relative distance Xd to the side object in the lateral direction can be detected, a lateral position at the relative distance Xd from the current lateral position Xe is defined as the activation threshold value Xa. Also, the position of the white line rather than the current lateral position of the side object may be defined as the activation threshold value Xa.

Then, at step S19, a determination is made as to whether or not the future lateral position Xf is larger than the activation threshold value Xa, that is, whether or not the future lateral position Xf is outside the activation threshold value Xa. When a determined result is that the future lateral position Xf is smaller than the activation threshold value Xa (Xf<Xa), a determination is made that there is no possibility of the lane change causing contact with the side object, and the processing goes to step S20. Meanwhile, when a determined result is that the future lateral position Xf is equal to or larger than the activation threshold value Xa (Xf≥Xa), a determination is made that there is a possibility of the lane change causing contact with the side vehicle, and the processing goes to step S21.

Incidentally, in order to prevent hunting of a determination on the activation, hysteresis may be provided for Xf, or stopping of the activation may be inhibited until a predetermined time elapses since the start of the activation of the approach prevention control. Also, when antiskid control, traction control, stability control, or the like is performed, the activation of the approach prevention control may be suppressed in order that the antiskid or other control has priority over the approach prevention control.

Then, at step S20, the approach prevention control is made inactive, and the processing returns to a predetermined main program.

Specifically, it is not necessary to suppress the lane change of the vehicle, and thus, a target yaw moment Ms is set equal to 0 (Ms=0) to stop driving the brake actuator 3. In other words, the master cylinder pressure is fed to the wheel cylinders, as given below:

$$P_{FL} = P_{FR} = Pm$$

$$P_{RL} = P_{RR} = Pmr$$

where Pmr denotes a rear wheel master cylinder pressure based on ideal front and rear braking force distribution.

Meanwhile, at step S21, the target yaw moment Ms is calculated in order to activate the approach prevention control, and the brake actuator 3 is drivingly controlled according to the calculated target yaw moment Ms.

First, the target yaw moment Ms to prevent the approach of the vehicle to the side object is calculated as given below:

$$Ms = Kr1 \times Kr2 \times (Km1 \times \phi + Km2 \times \Psi m)$$

where Kr1 denotes gain determined from vehicle specifications, and Kr2 denotes gain determined according to the vehicle speed V and becomes larger as the vehicle speed V is higher.

According to the above equation, the target yaw moment Ms to suppress the lane change of the vehicle becomes larger as the yaw angle φ or the target yaw rate Ψm becomes larger.

Then, target hydraulic pressures $P_{FL}$ to $P_{RR}$ of the wheel cylinders are calculated.

First, braking force differences ΔPf and ΔPr between the left and right wheels for purposes of suppression of the lane change are calculated as given below:

$$\Delta Pf = 2 \times Kf \times \{Ms \times R\}/T$$

$$\Delta Pf = 2 \times Kr \times \{Ms \times (1-R)\}/T$$

where T denotes tread and, for the sake of convenience, it is assumed that the front tread is the same as the rear tread, Kf and Kr denote factors to convert braking forces to hydraulic pressures, for the front and rear wheels, respectively, and are determined by brake specifications, and R denotes braking force distribution between the front and rear wheels.

Therefore, for the lane change in the leftward direction, the target hydraulic pressures $P_{FL}$ to $P_{RR}$ of the wheel cylinders are calculated in order to impart a yaw moment in the rightward direction to the vehicle, as given below.

$$P_{FL} = Pm$$

$$P_{FR} = Pm + \Delta Pf$$

$$P_{RL} = Pmr$$

$$P_{RR} = Pmr + \Delta Pr$$

Meanwhile, for the lane change in the rightward direction, the target hydraulic pressures $P_{FL}$ to $P_{RR}$ of the wheel cylinders are calculated in order to impart a yaw moment in the leftward direction to the vehicle, as given below.

$$P_{FL} = Pm + \Delta Pf$$

$$P_{FR} = Pm$$

$$P_{RL} = Pmr + \Delta Pr$$

$$P_{RR} = Pmr$$

Then, the brake actuator 3 is drivingly controlled to produce the target hydraulic pressures $P_{FL}$ to $P_{RR}$ in the wheel cylinders, and the warning device 20 is driven to give a warning to notify the driver of the presence of the side object or the suppression of the lane change, and thereafter, the processing returns to the predetermined main program.

Incidentally, it is not necessary to issue the warning at the same time that the brake actuator 3 is drivingly controlled, and thus, a configuration may be such that an activation threshold value Xw to issue the warning and an activation threshold value Xy to impart the yaw moment are individually prepared for the future lateral position Xf, and the activation threshold value Xw for the warning is set relatively smaller than the activation threshold value Xy for control of the yaw moment (Xw<Xy) thereby to, first, issue the warning to urge the driver to stop changing lanes, prior to intervention on vehicle driving by control.

[Operations]

It will now be assumed that, as shown in FIG. 9, a driver's vehicle is about to change lanes to get into the right adjacent lane by the driver operating the direction indicator switch 13 in the rightward direction, and a side vehicle is running to the right side of the vehicle and a little towards the rear of the vehicle, which can possibly be in the driver's blind spot.

First, the radar device 6R detects the side vehicle (at step S3). Then, the future lateral position Xf as the distance in the lateral direction between the current lateral position of the vehicle and the lateral position thereof which the vehicle reaches after the lapse of the frontward watch time (for example, 1 sec) is calculated (at step S5), and, when the future lateral position Xf reaches the activation threshold value Xa (that is, when a determined result is "No" at step S19), a determination is made that there is a possibility of the vehicle coming into contact with the side vehicle. Then, in order to prevent the approach of the vehicle to the side object, the yaw moment in the leftward direction is produced by the braking force differences between the left and right wheels, and the warning is given to notify the driver of the presence of the side object (at step S21). This allows the driver to recognize the presence of the side vehicle, and enables urging the driver to wait for a chance to change lanes until the side vehicle runs past the vehicle.

Incidentally, it is assumed that, in the absence of other vehicles approaching from the rear, a vehicle starts changing lanes to get in an adjacent lane, and, after the vehicle has begun entering the adjacent lane, other vehicle is approaching from the rear in the target lane. In this case, it may be proper that the vehicle quickly finishes changing lanes rather than stops changing lanes to make way for the other vehicle approaching from the rear. In other words, the right of way varies according to circumstances on the occasion, and therefore, a driver may possibly feel uncomfortable if a lane change is invariably suppressed whenever the approach of the other vehicle from the rear is detected.

Therefore, when, in the absence of detection of the side object, the vehicle starts entering the adjacent lane in order to change lanes, the activation of the approach prevention control is suppressed even if the side object appears after the start of the entry. Thereby, improper intervention of control, that is, the activation of the approach prevention control, can be prevented.

Specifically, in the absence of detection of the side object (that is, when a determined result is "Yes" at step S7), a determination is made as to whether or not the vehicle has started entering the adjacent lane.

Here, when the lateral position of the vehicle after the lapse of the frontward watch time (hereinafter, sometimes referred to as the future lateral position) is in the adjacent lane (that is, the future lateral position Xf is larger than the current lateral position Xe), and the lateral position (or the future lateral position) of the vehicle after the lapse of the frontward watch time lies toward the adjacent lane relative to the position that is the predetermined criterion threshold value Xj away from the white line (that is, when a determined result is "Yes" at step S11), a determination is made that the vehicle has started entering the adjacent lane, and the activation suppression flag Fc is set to "1" (Fc=1) (at step S12). Also, when the predetermined setting time Tth elapses since the instant when the future lateral position of the vehicle has crossed over the white line (that is, since the instant when the future lateral position Xf has become larger than the current lateral position Xe) (that is, when a determined result is "Yes" at step S14), a determination is made that the vehicle has started entering the adjacent lane, and the activation suppression flag Fc is set to "1" (Fc=1) (at step S12).

Thus, the driving control device is configured to detect that the future lateral position of the vehicle has crossed over the lateral position that is the criterion threshold value Xj away in a direction toward the inside of the adjacent lane with respect to the white line, or that the setting time Tth elapses since the instant when the future lateral position of the vehicle has crossed over the white line, and, therefore, can determine with ease and accuracy that the vehicle has started entering the adjacent lane.

Here, description will be given with regard to how to determine the criterion threshold value Xj and the setting time Tth.

First, the degree of difficulty of passing the vehicle for the side object approaching the vehicle from the rear in the target lane is estimated under a condition where the vehicle has started entering the adjacent lane (at step S8). Specifically, the degree of difficulty of passing the vehicle is estimated to be high, when the lane width of the target lane is narrow, when the curvature of the road is large, when the target lane is the carpool lane, or when the vehicle width of the side vehicle is large. As the degree of difficulty of passing is higher, the side object approaching from the rear is more likely to make way for the vehicle, which is a situation where it may be proper that the vehicle quickly finishes changing lanes.

Therefore, a criterion of judgment, that is, the criterion threshold value Xj or the setting time Tth, is set so as to render it easier to determine that the vehicle has started entering the adjacent lane, as the degree of difficulty of passing is higher. Specifically, as the degree of difficulty is higher, the setting value Xth is set smaller thereby to set the criterion threshold value Xj smaller and thus render it easier to determine that the vehicle has started entering the adjacent lane (at steps S9 and S10). Also, as the degree of difficulty is higher, the setting time Tth is set shorter thereby to render it easier to determine that the vehicle has started entering the adjacent lane (at step S9).

Thus, the driving control device is configured to render it easier to determine that the vehicle has started entering the adjacent lane, as the degree of difficulty of passing with which the side vehicle can pass the vehicle is higher, and thereby, the device can determine at an earlier time that the vehicle has started entering the adjacent lane. Therefore, in a situation where it may be proper that the vehicle quickly finishes changing lanes, the activation suppression flag Fc is set to "1" (Fc=1) at an earlier time thereby to determine suppression of the activation of the approach prevention control at an earlier time and thus enable preventing the driver from feeling uncomfortable with higher reliability.

Next, description will be given with regard to conditions for canceling suppression of the approach prevention control.

When the lane change of the vehicle is finished and a determination can be made that there is no possibility of the side vehicle passing the vehicle, the activation of the approach prevention control can be canceled. Therefore, when the predetermined time elapses since the instant when a determination has been made that the vehicle started entering the adjacent lane, when the amount of sideways movement of the vehicle reaches the predetermined amount of sideways movement, or when the current lateral position Xe of the vehicle crosses over the predetermined lateral position in the adjacent lane (that is, when a determined result is "Yes" at step S16), the vehicle is judged as having almost finished changing lanes, and the activation suppression flag Fc is reset to "0" (Fc=0) (at step S15). This enables avoiding unnecessary suppression of the approach prevention control.

[Modifications]

Figure 10:
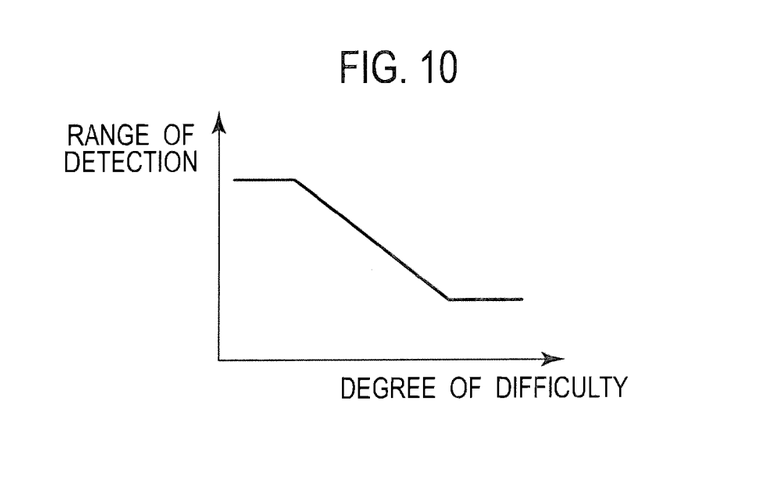
FIG. 10 is a map used to set a detection region.
Figure 11:
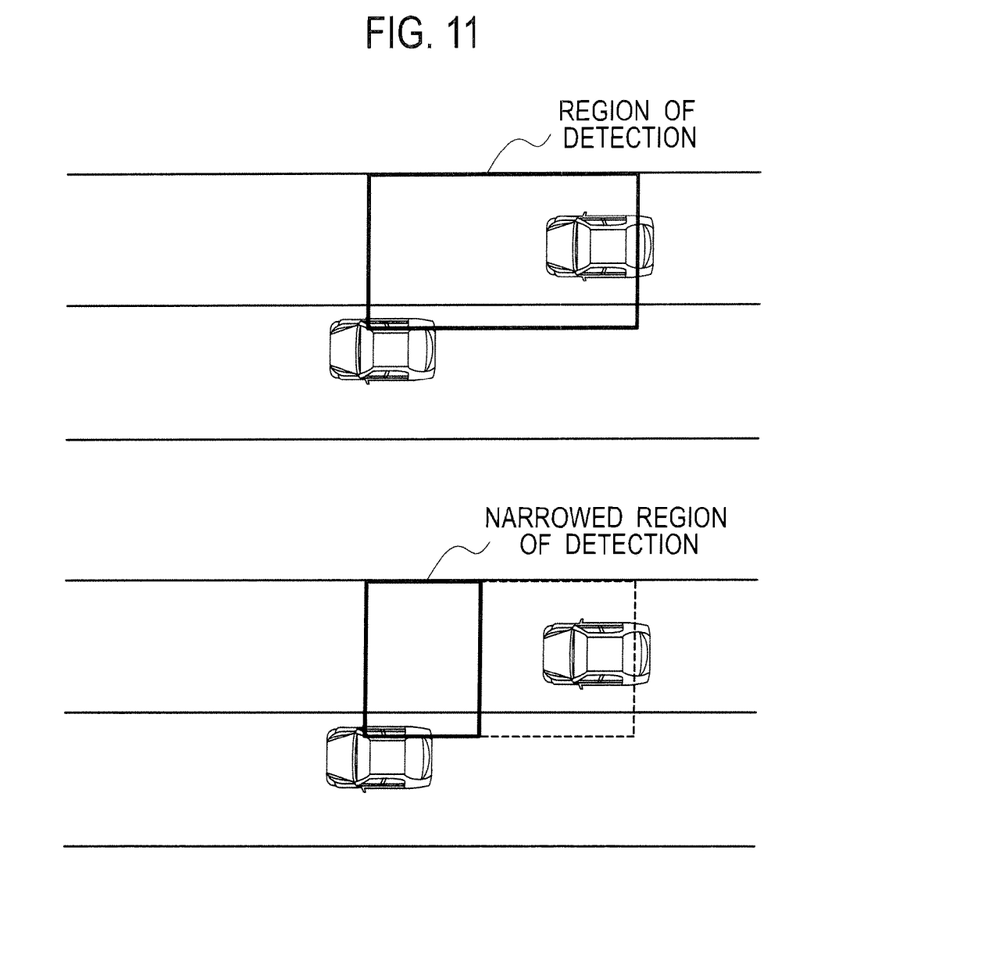
FIG. 11 is a view showing how to narrow the detection region.

Incidentally, in the embodiment, the criterion threshold value Xj or the setting time Tth is changed in order to render it easier to determine that the vehicle has started entering the adjacent lane, as the degree of difficulty of passing is higher; however, another approach is also possible. In other words, as described above, in the embodiment, the suppression of the approach prevention control is performed under two conditions: to "detect that the vehicle has started entering the adjacent lane" in "the absence of detection of the side object," and therefore, rendering it easier to "detect that the vehicle has started entering the adjacent lane," as one of the two conditions, as the degree of difficulty of passing is higher, renders it easier to suppress the approach prevention control as the degree of difficulty of passing is higher. However, in short, in order to render it easier to suppress the approach prevention control, any one of the two conditions: to "detect that the vehicle has started entering the adjacent lane" in "the absence of detection of the side vehicle" is actively created thereby to enable rendering it easier to suppress the approach prevention control, and therefore, "the absence of detection of the side vehicle" as the other of the two conditions may be actively created (or facilitated) thereby to render it easier to suppress the approach prevention control. Therefore, a range of detection is set based on a map such as is shown in FIG. 10 according to the degree of difficulty of passing, and, as shown in FIG. 11, the region of detection of the side object by the radar devices 6L, 6R may also be set narrower as the degree of difficulty of passing is higher, thereby to render it easier to suppress the approach prevention control. This also enables rendering it easier to suppress the approach prevention control as the degree of difficulty of passing is higher, and thus can facilitate suppressing the activation of the approach prevention control, in a situation where the degree of difficulty of passing is high and it may be proper that the vehicle quickly finishes changing lanes.

Also, in the embodiment, when the vehicle starts entering the adjacent lane, the approach prevention control is made completely inactive; however, the present invention is not so limited, and, for example, an operation condition may be set so as to render it difficult to determine the start of the activation of the approach prevention control, thereby to suppress determining the start of the activation of the approach prevention control. Also, at the time of the approach prevention control, the amount of control may be reduced. This also enables suppressing the activation of the control for suppressing sideways movement of the vehicle towards the side object.

First, in order to render it difficult to determine the start of the activation of the approach prevention control, at least any one of the future lateral position Xf and the activation threshold value Xa may be corrected in a direction away from each other so as to make it difficult for the future lateral position Xf to cross over the activation threshold value Xa. In other words, the future lateral position Xf is corrected to be smaller (that is, the future lateral position is corrected in a direction toward the inside of the lane), or the activation threshold value Xa is corrected to be larger. This enables rendering it difficult to activate the approach prevention control, and thus suppressing the activation of the control for suppressing sideways movement of the vehicle towards the side object. Also, as shown in FIG. 11, the region of detection of the side object by the radar devices 6L, 6R may be set narrower thereby to render it difficult to activate the approach prevention control, as is the case with the above. In this case, as shown in FIG. 11, the width of the region of detection is not changed and the position of a rear end of the region is shifted towards the front so as to detect only the side object right to the side of the vehicle. This enables rendering it difficult to activate the approach prevention control.

Also, in order to reduce the amount of control at the time of the approach prevention control, the target yaw moment Ms may be corrected so as to decrease, or warning sounds may be reduced. This enables reducing the amount of control at the time of the approach prevention control, and thus suppressing the activation of the control for suppressing sideways movement of the vehicle towards the side object.

Also, in the embodiment, the braking force differences between the left and right wheels are used to achieve the target yaw moment Ms; however, another approach is also possible. Electric power steering or the like, for example, may be used to steer the steering control wheels in a direction opposite to a lane change and thereby achieve the target yaw moment Ms.

Also, in the embodiment, the degree of difficulty of passing is estimated by referring to the lane width of the target lane, the curvature of the road, the type of driving lane of the target lane, or the vehicle width of the side vehicle; however, another approach is also possible. For example, as the road surface of the lane has a lower coefficient of friction, the road surface of the adjacent lane also has a lower coefficient of friction, and thus, passing the vehicle can be expected to be more difficult for the side vehicle approaching the vehicle from the rear. Therefore, the degree of difficulty of passing may be estimated to be higher as the coefficient of friction of the road surface is lower.

[Advantageous Effects]

In accordance with the above, the processing for detection in the first region of detection by the radar devices 6L, 6R corresponds to "first side object detecting means," the processing of steps S18 to S21 corresponds to "control means," the processing of steps S7, S9 to S11, S13 and S14 corresponds to "entry start determination means," and the processing of steps S12, and S15 to S17 corresponds to "activation suppressing means." Also, the processing of step S5 corresponds to "future lateral position estimating means," the processing of step S8 corresponds to "degree-of-difficulty estimating means," and the processing for detection in the second region of detection by the radar devices 6L, 6R corresponds to "second side object detecting means."

(1) A driving control device according to the present invention includes first side object detecting means for detecting a side object present to the side of a vehicle as well as towards the rear of the vehicle; control means for activating a control for suppressing sideways movement of the vehicle towards the side object, when the first side object detecting means detects the side object; entry start determination means for determining whether or not the vehicle has started entering an adjacent lane in order to change lanes, in the absence of detection of the side object by the first side object detecting means; and activation suppressing means for suppressing the activation of the control by the control means, when the entry start determination means determines that the vehicle has started entering the adjacent lane.

Thus, when, in the absence of detection of the side object, the vehicle starts entering the adjacent lane in order to change lanes, the activation of the control is suppressed even if the side object is detected after the start of the entry, and therefore, improper intervention of control can be prevented.

(2) Also, the driving control device includes future lateral position estimating means for estimating a future lateral position of the vehicle that is a lateral position which the vehicle reaches after a lapse of a predetermined time, with respect to a lane separation line marked on a road surface, and the entry start determination means determines that the vehicle has started entering the adjacent lane, when, in the absence of detection of the side object by the first side object detecting means, the future lateral position estimated by the future lateral position estimating means is in the adjacent lane and is outside a predetermined lateral position as a first criterion threshold value.

Thus, the driving control device is configured to detect that the future lateral position is outside the criterion threshold value, and, therefore, can determine with ease and accuracy that the vehicle has started entering the adjacent lane.

(3) Further, the driving control device includes future lateral position estimating means for estimating a future lateral position of the vehicle that is a lateral position which the vehicle reaches after a lapse of a predetermined time, with respect to a lane separation line marked on a road surface, and the entry start determination means determines that the vehicle has started entering the adjacent lane, when, in the absence of detection of the side object by the first side object detecting means, a predetermined time as a second criterion threshold value elapses since the instant when the future lateral position estimated by the future lateral position estimating means has crossed over the lane separation line towards the adjacent lane.

Thus, the driving control device is configured to detect that the predetermined time elapses since the instant when the future lateral position has crossed over the lane separation line, and, therefore, can determine with ease and accuracy that the vehicle has started entering the adjacent lane.

(4) Further, the driving control device includes degree-of-difficulty estimating means for estimating the degree of difficulty of passing the vehicle for the side object approaching the vehicle from the rear in the target adjacent lane, under a condition where the vehicle has started entering the adjacent lane, and the entry start determination means sets a criterion of judgment so as to render it easier to determine that the vehicle has started entering the adjacent lane, as the degree of difficulty estimated by the degree-of-difficulty estimating means is higher.

Generally, as the degree of difficulty of passing is higher, the side object approaching from the rear is more likely to make way for the vehicle, and thus, it may be proper that the vehicle quickly finishes changing lanes. Therefore, the driving control device is configured to render it easier to determine that the vehicle has started entering the adjacent lane, as the degree of difficulty of passing is higher, and thereby, in a situation where it may be proper that the vehicle quickly finishes changing lanes, the activation of the control becomes easier to suppress, so that improper intervention of control can be prevented.

(5) The entry start determination means renders it easier to determine that the vehicle has started entering the adjacent lane, by setting the predetermined lateral position as the first criterion threshold value to a position closer to the lane separation line, as the degree of difficulty estimated by the degree-of-difficulty estimating means is higher.

Thus, the driving control device is configured to set the predetermined lateral position to the position closer to the lane separation line, and, therefore, can facilitate rendering it easier to determine that the vehicle has started entering the adjacent lane.

(6) The entry start determination means renders it easier to determine that the vehicle has started entering the adjacent lane, by setting shorter the predetermined time as the second criterion threshold value, as the degree of difficulty estimated by the degree-of-difficulty estimating means is higher.

Thus, the driving control device is configured to set the predetermined time shorter, and, therefore, can facilitate rendering it easier to determine that the vehicle has started entering the adjacent lane.

(7) The entry start determination means renders it easier to determine that the vehicle has started entering the adjacent lane, by setting narrower a region of detection of the side object by the first side object detecting means, as the degree of difficulty estimated by the degree-of-difficulty estimating means is higher.

Thus, the driving control device is configured to set the region of detection of the side object narrower, and, therefore, can facilitate rendering it easier to determine that the vehicle has started entering the adjacent lane.

(8) The degree-of-difficulty estimating means estimates that the degree of difficulty of passing the vehicle is higher, as a lane width of the target lane is narrower.

Thus, the driving control device is configured to estimate the degree of difficulty according to the width of the target lane, and, therefore, can facilitate estimating the degree of difficulty of passing the vehicle.

(9) The degree-of-difficulty estimating means estimates that the degree of difficulty of passing the vehicle is higher, as a curvature of a road is larger.

Thus, the driving control device is configured to estimate the degree of difficulty according to the curvature of the road, and, therefore, can facilitate estimating the degree of difficulty of passing the vehicle.

(10) The degree-of-difficulty estimating means estimates that the degree of difficulty of passing the vehicle is higher, when the target lane is a carpool lane, than when the target lane is not the carpool lane.

Thus, the driving control device is configured to estimate the degree of difficulty according to whether or not the target lane is the carpool lane, and, therefore, can facilitate estimating the degree of difficulty of passing the vehicle.

(11) Also, the driving control device includes second side object detecting means for detecting a side object present to the side of the vehicle and towards the rear of the vehicle farther away from the region of detection of the side object by the side object detecting means, and the degree-of-difficulty estimating means estimates that the degree of difficulty of passing the vehicle is higher, as a vehicle width of the side object detected by the second side object detecting means is larger, when, in the absence of detection of the side object by the first side object detecting means, the second side object detecting means detects the side object.

Thus, the driving control device is configured to estimate the degree of difficulty according to the vehicle width of the side object, and, therefore, can facilitate estimating the degree of difficulty of passing the vehicle.

(12) The activation suppressing means suppresses the activation of the control by the control means, until a predetermined time as a first cancel condition elapses since the instant when the entry start determination means has determined that the vehicle started entering the adjacent lane.

Thus, the driving control device is configured to detect a lapse of the predetermined time and thereby cancel suppression of the activation, and, therefore, can avoid unnecessary suppression of the activation of the control.

(13) The activation suppressing means suppresses the activation of the control by the control means, until the amount of sideways movement of the vehicle reaches a predetermined amount of sideways movement as a second cancel condition since the instant when the entry start determination means has determined that the vehicle started entering the adjacent lane.

Thus, the driving control device is configured to cancel suppression of the activation by detecting that the predetermined amount of sideways movement is reached, and, therefore, can avoid unnecessary suppression of the activation of the control.

(14) The activation suppressing means suppresses the activation of the control by the control means, until a lateral position of the vehicle relative to the lane separation line marked on the road surface reaches a predetermined lateral position as a third cancel condition since the instant when the entry start determination means has determined that the vehicle started entering the adjacent lane.

Thus, the driving control device is configured to cancel suppression of the activation by detecting that the predetermined lateral position is reached, and, therefore, can avoid unnecessary suppression of the activation of the control.

(15) Further, the driving control device includes future lateral position estimating means for estimating a future lateral position of the vehicle that is a lateral position which the vehicle reaches after a lapse of a predetermined time, with respect to a lane separation line marked on a road surface, and the control means activates the control for suppressing sideways movement of the vehicle towards the side object, when, in the presence of detection of the side object by the first side object detecting means, the future lateral position estimated by the future lateral position estimating means crosses over a predetermined lateral position as an activation threshold value, towards the side object.

Thus, the driving control device is configured to activate the control for suppressing sideways movement of the vehicle when the future lateral position crosses over the activation threshold value, and, therefore, enables proper intervention of control.

(16) The activation suppressing means suppresses the activation of the control by the control means, by correcting at least any one of the future lateral position and the predetermined lateral position as the activation threshold value, so as to make it difficult for the future lateral position to cross over the predetermined lateral position as the activation threshold value.

Thus, the driving control device is configured to correct at least any one of the future lateral position and the activation threshold value so as to make it difficult for the future lateral position to cross over the activation threshold value, and, therefore, can facilitate suppression of the activation of the control.

(17) The activation suppressing means suppresses the activation of the control by the control means, by setting narrower the region of detection of the side object by the first side object detecting means.

Thus, the driving control device is configured to narrow the region of detection of the side object, and, therefore, can facilitate suppression of the activation.

(18) The control means imparts a yaw moment in a direction opposite to the side of the side object to the vehicle as the control for suppressing sideways movement of the vehicle towards the side object.

Thus, the driving control device is configured to impart the yaw moment in the direction opposite to the side of the side object to the vehicle, and, therefore, enables effective suppression of sideways movement of the vehicle towards the side object.

(19) The activation suppressing means suppresses the activation of the control by suppressing the yaw moment in the direction opposite to the side of the side object imparted to the vehicle.

Thus, the driving control device is configured to suppress the yaw moment in the direction opposite to the side of the side object, and, therefore, can facilitate suppression of the activation of the control.

(20) The control means gives a warning to notify a driver of the presence of the side object as the control for suppressing sideways movement of the vehicle towards the side object.

Thus, the driving control device is configured to give the warning to notify the driver of the presence of the side object, and, therefore, enables effective suppression of sideways movement of the vehicle towards the side object.

(21) The activation suppressing means suppresses the activation of the control by suppressing the warning about the presence of the side object to the driver.

Thus, the driving control device is configured to suppress the warning about the presence of the side object to the driver, and, therefore, can facilitate suppression of the activation of the control.

(22) The activation suppressing means inhibits the activation of the control by the control means, until a predetermined condition is satisfied since the instant when the entry start determination means has determined that the vehicle started entering the adjacent lane.

Thus, the driving control device is configured to inhibit the activation of the control, and, therefore, can prevent improper intervention of control.

(23) In the driving control device, the control for suppressing sideways movement of the vehicle towards the side object is activated when the side object present to the side of the vehicle as well as towards the rear of the vehicle is detected, and the activation of the control is suppressed even if the side object is detected, when, in the absence of detection of the side object, the vehicle starts entering the adjacent lane in order to change lanes.

Thus, when, in the absence of detection of the side object, the vehicle starts entering the adjacent lane in order to change lanes, the activation of the control is suppressed even if the side object is detected after the start of the entry, and therefore, improper intervention of control can be prevented.

This application is based upon and claims the benefit of priority of the prior Japanese Patent Application No. 2009-292705, filed on Dec. 24, 2009, and the prior Japanese Patent Application No. 2010-256594, filed on Nov. 17, 2010, the entire contents of which are incorporated herein by reference.

INDUSTRIAL APPLICABILITY

According to the driving control device of the present invention, when, in the absence of detection of the side object, the vehicle starts entering the adjacent lane in order to change lanes, the activation of the control is suppressed even if the side object is detected after the start of the entry, and therefore, improper intervention of control can be prevented.

REFERENCE SIGNS LIST

2FL to 2RR wheel cylinders
3 brake actuator
4 controller
5 camera
6L, 6R radar devices
10 pressure sensor
11 steering angle sensor
12 wheel speed sensor
13 direction indicator switch
14 navigation unit
20 warning device

The invention claimed is:

1. A driving control device comprising:
a first side object detecting unit configured to detect a side object present to a side of a vehicle and towards a rear of the vehicle;
a control unit configured to activate a sideways movement suppressing control for suppressing sideways movement of the vehicle towards the side object, when the first side object detecting unit detects the side object, the sideways movement accompanying a change in a lateral position of the vehicle relative to a lane;
an entry start determination unit configured to determine whether the vehicle has started entering an adjacent lane based on the lateral position of the vehicle; and
an activation suppressing unit configured to suppress activation of the sideways movement suppressing control by the control unit, when the entry start determination unit determines that the vehicle has started entering the adjacent lane, and the first side object detecting unit detects the side object in the adjacent lane targeted under a condition where the vehicle has started entering the adjacent lane,
wherein the vehicle has started entering the adjacent lane when a computed future lateral position of the vehicle exceeds a criterion threshold value for the lateral position.

2. The driving control device according to claim 1, comprising a future lateral position estimating unit configured to estimate the computed future lateral position of the vehicle that is a lateral position which the vehicle reaches after a predetermined time, with respect to a lane separation line marked on a road surface,
wherein the entry start determination unit determines that the vehicle has started entering the adjacent lane, when, without detection of the side object by the first side object detecting unit, the future lateral position estimated by the future lateral position estimating unit is in the adjacent lane and is outside a predetermined lateral position as a first criterion threshold value.

3. The driving control device according to claim 1, comprising a future lateral position estimating unit configured to estimate the computed future lateral position of the vehicle that is a lateral position which the vehicle reaches after a predetermined time, with respect to a lane separation line marked on a road surface, wherein
the entry start determination unit determines that the vehicle has started entering the adjacent lane, when, without detection of the side object by the first side object detecting unit, a predetermined time as a second criterion threshold value elapses after the future lateral position estimated by the future lateral position estimating unit has crossed over the lane separation line towards the adjacent lane.

4. The driving control device according to claim 1, wherein the activation suppressing unit suppresses activation of the sideways movement suppressing control by the control unit, until a predetermined time as a first cancel condition elapses after the entry start determination unit has determined that the vehicle started entering the adjacent lane.

5. The driving control device according to claim 1, wherein the activation suppressing unit suppresses activation of the sideways movement suppressing control by the control unit, until sideways movement of the vehicle reaches a predetermined amount of sideways movement as a second cancel condition after the entry start determination unit has determined that the vehicle started entering the adjacent lane.

6. The driving control device according to claim 1, wherein the activation suppressing unit suppresses activation of the sideways movement suppressing control by the control unit, until a lateral position of the vehicle relative to a lane separation line marked on a road surface reaches a predetermined lateral position as a third cancel condition after the entry start determination unit has determined that the vehicle started entering the adjacent lane.

7. The driving control device according to claim 1, comprising a future lateral position estimating unit configured to estimate the computed future lateral position of the vehicle that is a lateral position which the vehicle reaches after a predetermined time, with respect to a lane separation line marked on a road surface, wherein
the control unit activates the sideways movement suppressing control for suppressing sideways movement of the vehicle towards the side object, when, with detection of the side object by the first side object detecting unit, the future lateral position estimated by the future lateral position estimating unit crosses over a predetermined lateral position as an activation threshold value, towards the side object.

8. The driving control device according to claim 7, wherein the activation suppressing unit suppresses activation of the sideways movement suppressing control by the control unit, by correcting at least one of the future lateral position and the predetermined lateral position as the activation threshold value, to hinder the future lateral position from crossing over the predetermined lateral position as the activation threshold value.

9. The driving control device according to claim 7, wherein the activation suppressing unit suppresses activation of the sideways movement suppressing control by the control unit, by setting narrower a region of detection of the side object by the first side object detecting unit.

10. The driving control device according to claim 1, wherein the control unit imparts a yaw moment in a direction opposite to the side of the side object as the control for suppressing sideways movement of the vehicle towards the side object.

11. The driving control device according to claim 10, wherein the activation suppressing unit suppresses activation of the sideways movement suppressing control by suppressing the yaw moment in the direction opposite to the side of the side object imparted to the vehicle.

12. The driving control device according to claim 1, wherein the control unit gives a warning to notify a driver that the side object is present as the control for suppressing sideways movement of the vehicle towards the side object.

13. The driving control device according to claim 12, wherein the activation suppressing unit suppresses activation of the sideways movement suppressing control by suppressing the warning to the driver that the side object is present.

14. The driving control device according to claim 1, wherein the activation suppressing unit inhibits activation of the sideways movement suppressing control by the control unit, until a predetermined condition is satisfied after the entry start determination unit has determined that the vehicle started entering the adjacent lane.

15. A driving control device comprising:
a first side object detecting unit configured to detect a side object present to a side of a vehicle and towards a rear of the vehicle;
a control unit configured to activate a sideways movement suppressing control for suppressing sideways movement of the vehicle towards the side object, when the first side object detecting unit detects the side object, the sideways movement accompanying a change in a lateral position of the vehicle relative to a lane;
an entry start determination unit configured to determine whether the vehicle has started entering an adjacent lane based on the lateral position of the vehicle;
an activation suppressing unit configured to suppress activation of the sideways movement suppressing control by the control unit, when the entry start determination unit determines that the vehicle has started entering the adjacent lane, and the first side object detecting unit detects the side object in the adjacent lane targeted under a condition where the vehicle has started entering the adjacent lane; and
a degree-of-difficulty estimating unit configured to estimate the degree of difficulty of passing the vehicle for the side object, wherein
the entry start determination unit sets a criterion of judgment to facilitate determination that the vehicle has started entering the adjacent lane, as the degree of difficulty estimated by the degree-of-difficulty estimating unit is higher.

16. The driving control device according to claim 15, wherein the entry start determination unit facilitates determination that the vehicle has started entering the adjacent lane, by setting a predetermined lateral position as a first criterion threshold value to a position closer to a lane separation line, as the degree of difficulty estimated by the degree-of-difficulty estimating unit is higher.

17. The driving control device according to claim 15, wherein the entry start determination unit facilitates determination that the vehicle has started entering the adjacent lane, by setting shorter a predetermined time as a second criterion threshold value, as the degree of difficulty estimated by the degree-of-difficulty estimating unit is higher.

18. The driving control device according to claim 15, wherein the entry start determination unit facilitates determination that the vehicle has started entering the adjacent lane, by setting narrower a region of detection of the side object by the first side object detecting unit, as the degree of difficulty estimated by the degree-of-difficulty estimating unit is higher.

19. The driving control device according to claim 15, wherein the degree-of-difficulty estimating unit estimates that the degree of difficulty of passing the vehicle is higher, as a lane width of the adjacent lane targeted is narrower.

20. The driving control device according to claim 15, wherein the degree-of-difficulty estimating unit estimates that the degree of difficulty of passing the vehicle is higher, as a curvature of a road is larger.

21. The driving control device according to claim 15, wherein the degree-of-difficulty estimating unit estimates that the degree of difficulty of passing the vehicle is higher when the adjacent lane targeted is a carpool lane than when the adjacent lane targeted is not the carpool lane.

22. The driving control device according to claim 15, comprising a second side object detecting unit configured to detect a side object present to the side of the vehicle and towards the rear of the vehicle farther away from a region of detection of the side object by the first side object detecting unit, wherein
the degree-of-difficulty estimating unit estimates that the degree of difficulty of passing the vehicle is higher, as a vehicle width of the side object detected by the second side object detecting unit is larger, when, without detection of the side object by the first side object detecting unit, the second side object detecting unit detects the side object.

23. A driving control device comprising:
first side object detecting means for detecting a side object present to a side of a vehicle and towards a rear of the vehicle;
control means for activating a sideways movement suppressing control for suppressing sideways movement of the vehicle towards the side object, when the first side object detecting means detects the side object, the sideways movement accompanying a change in a lateral position of the vehicle relative to a road lane;
entry start determination means for determining whether the vehicle has started entering an adjacent lane based on the lateral position of the vehicle; and
activation suppressing means for suppressing activation of the sideways movement suppressing control by the control means, when the entry start determination means determines that the vehicle has started entering the adjacent lane, and the first side object detecting means detects the side object in the adjacent lane targeted under a condition where the vehicle has started entering the adjacent lane,
wherein the vehicle has started entering the adjacent lane when a computed future lateral position of the vehicle exceeds a criterion threshold value for the lateral position.

* * * * *